(12) United States Patent
Massarenti et al.

(10) Patent No.: US 12,468,720 B2
(45) Date of Patent: Nov. 11, 2025

(54) JUST-IN-TIME SYNTHETIC COMPUTATIONS ON TIME-SERIES DATA USING A METRICS APPROACH

(71) Applicants: Davide Massarenti, Bothell, WA (US); Sridhar Chandrashekar, Sammamish, WA (US)

(72) Inventors: Davide Massarenti, Bothell, WA (US); Sridhar Chandrashekar, Sammamish, WA (US)

(*) Notice: Subject to any disclaimer, the term of this patent is extended or adjusted under 35 U.S.C. 154(b) by 0 days.

(21) Appl. No.: 18/411,023

(22) Filed: Jan. 12, 2024

(65) Prior Publication Data

US 2024/0273109 A1    Aug. 15, 2024

Related U.S. Application Data

(63) Continuation-in-part of application No. 18/239,102, filed on Aug. 28, 2023.

(60) Provisional application No. 63/402,300, filed on Aug. 30, 2022.

(51) Int. Cl.
*G06F 16/2458* (2019.01)
*G06F 17/18* (2006.01)

(52) U.S. Cl.
CPC .......... *G06F 16/2477* (2019.01); *G06F 17/18* (2013.01)

(58) Field of Classification Search
None
See application file for complete search history.

(56) References Cited

U.S. PATENT DOCUMENTS

2020/0167361 A1* 5/2020 Princehouse ..... G06F 16/24568
2021/0034581 A1* 2/2021 Boven ................ G06F 16/2465

* cited by examiner

*Primary Examiner* — Kannan Shanmugasundaram

(57) ABSTRACT

In one aspect, a computerized method for just-in-time synthetic computations on time-series data using a metrics approach, comprising: receiving a set of raw time-series data; synchronizing the raw time-series data; implementing a metrics feature that enables the creation of a plurality of complex metrics that operate on time series data; and enabling a query of the computed data just as a query of the raw time series data is performed.

6 Claims, 2 Drawing Sheets

JUST-IN-TIME SYNTHETIC COMPUTATIONS ON TIME-SERIES DATA USING A METRICS APPROACH

CLAIM OF PRIORITY

This application claims priority to U.S. Provisional patent application Ser. No. 18/239,102, filed on Aug. 28, 2023 and titled Method and Systems for Cloud Security Operations. This utility patent application is hereby incorporated by reference in its entirety.

U.S. Provisional patent application Ser. No. 18/239,102 claims priority to U.S. Provisional Patent Application No. 63/402,300, filed on 30 Aug. 2022 and titled heuristic-based classification of software discovered connected devices.

BACKGROUND

The values streamed from a single control point are useful but correlating them with values from other control points can discover new insights about a system. The correlations should look and feel like the native control points, in the sense that they should be usable wherever a native control point could be used. In addition, correlations should be composable, such that higher-level insights could be extracted. Finally, this correlation logic should be user-customizable, not baked into the rigid structure of the product.

SUMMARY OF THE INVENTION

In one aspect, a computerized method for just-in-time synthetic computations on time-series data using a metrics approach, comprising: receiving a set of raw time-series data; synchronizing the raw time-series data; implementing a metrics feature that enables the creation of a plurality of complex metrics that operate on time series data; and enabling a query of the computed data just as a query of the raw time series data is performed.

Figure 1:
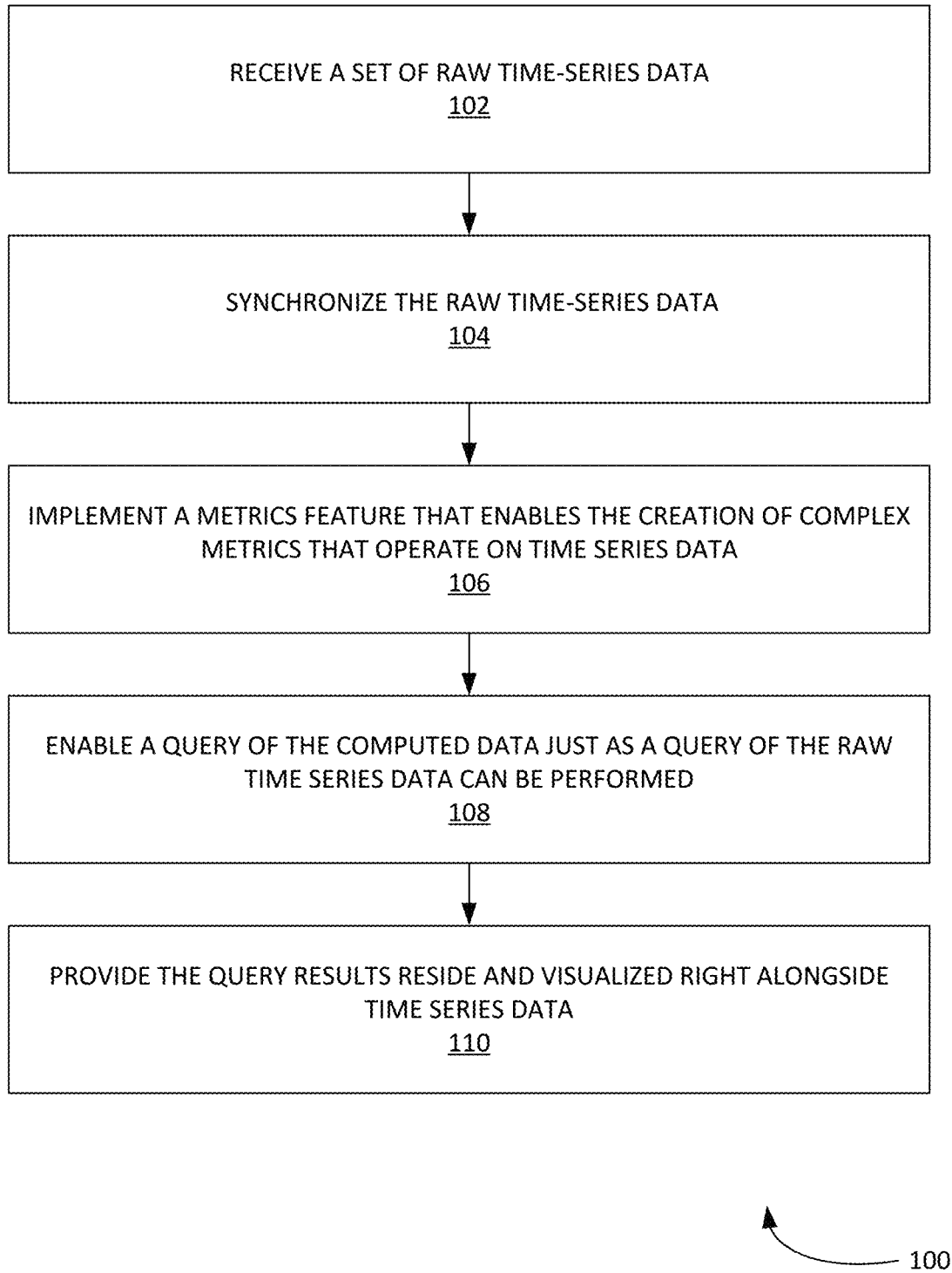
FIG. 1 illustrates an example process for a just-in-time synthetic computations on time-series data using a metrics approach, according to some embodiments.

The Figures described above are a representative set and are not an exhaustive with respect to embodying the invention.

DESCRIPTION

Disclosed are a system, method, and article of manufacture for just-in-time synthetic computations on time-series data using a metrics approach. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Cloud computing architecture refers to the components and subcomponents required for cloud computing. These components typically consist of a front-end platform (fat client, thin client, mobile), back-end platforms (servers, storage), a cloud-based delivery, and a network (Internet, Intranet, Intercloud). Combined, these components can make up cloud computing architecture. Cloud computing architectures and/or platforms can be referred to as the 'cloud' herein as well.

Cloud resource model (CRM) provides ability to define resource characteristics, Hierarchy, dependencies, and its action in a declarative model and embed them in Open API specification. CRM allows both humans and computers to understand and discover capabilities and characteristics of cloud service and its resources.

Just-in-time (JIT) computation (e.g. on demand computation) can be computations implemented during execution of a relevant program rather than at a previous time.

Synthetic computation can include various computation methods, such as, inter alia: Boolean logic decisions, analog signal processing, neural-like architectures, and the like.

Synthetic metrics are values that are the result of combining other metrics. These other metrics can be, inter alia: measurements of properties of designs, systems, and/or user performance. Synthetic metrics can be a collection of multi-stage steps required to complete an API call or transaction for example. For tabular synthetic data, metrics are created to quantify how the synthetic data compares to the real data. Each metric can measure an aspect of the data, such as coverage or correlation, allowing you to identify which specific elements have been preserved or forgotten during the synthetic data process.

Time series is a series of data points indexed (and/or listed, graphed, etc.) in a time order. In some examples, a time series can be a sequence of data points taken at successive equally spaced points in time. Time-series data can be a sequence of discrete-time data.

Example Systems and Methods

A multi-cloud governance platform is provided that empowers enterprises to rapidly achieve autonomous and continuous cloud governance and compliance at scale. Multi-cloud governance platform is delivered to end users in the form of multiple product offerings, bundled for a specific set of cloud governance pillars based on the client's needs. Example multi-cloud governance platform's offerings and associated cloud governance pillars are now discussed.

The multi-cloud governance platform can provide FinOps as a solution offering that is designed to help an entity develop a culture of financial accountability and realize the benefits of the cloud faster. The multi-cloud governance platform SecOps as a solution offering designed to help keep cloud assets secure and compliant. The multi-cloud governance platform is a solution offering designed to help optimize cloud operations and cost management in order to provide accessibility, availability, flexibility, and efficiency while also boosting business agility and outcomes. The multi-cloud governance platform provides a Well-Architected Assessment functionality (e.g. CoreStack Assessments®, etc.) that is designed to help an entity adopt best practices according to well-architected frameworks, gain continuous visibility, and manage risk of cloud workloads with assessments, policies, and reports that allow an administrator to review the state of applications and get a clear understanding of risk trends over time.

Well-Architected Assessment functionality helps enterprises adopt cloud best practices, manage risk, and maintain reliable, secure, resilient, cost-efficient, performant, and sustainable cloud infrastructures.

Cloud Governance Pillars that can be implemented by the multi-cloud governance platform are now discussed. The multi-cloud governance platform can enable governing of cloud assets involves cost-efficient and effective management of resources in a cloud environment while adhering to security and compliance standards. There are several factors that can be involved in a successful implementation of cloud governance. The multi-cloud governance platform has encompassed all these factors into its cloud governance pillars. The following table explains the key cloud governance pillars developed by Multi-cloud governance platform.

The multi-cloud governance platform utilizes various operations that provide the capability to operate and manage various cloud resources efficiently and effectively using various features such as automation, monitoring, notifications, activity tracking.

The multi-cloud governance platform utilizes various security operations that enable management of the security governance of various cloud accounts and identify the security vulnerabilities and threats and resolve them.

The multi-cloud governance platform utilizes various manages cost. The multi-cloud governance platform enables users to create a customized controlling mechanism that can control a customer's cloud expenses within budget and reduce cloud waste by continually discovering and eliminating inefficient resources.

The multi-cloud governance platform utilizes various access operations. The multi-cloud governance platform utilizes various allows administrators to configure secure access of resources in a cloud environment and protect the users' data and assets from unauthorized access.

The multi-cloud governance platform utilizes various resource management operations. The multi-cloud governance platform enables users to define, enforce, and track the resource naming and tagging standards, sizing, and their usage by region. It also enables a customer to follow consistent and standard practices pertaining to resource deployment, management, and reporting.

The multi-cloud governance platform utilizes various compliance actions. The multi-cloud governance platform guides users to assess a cloud environment for its compliance status against standards and regulations that are relevant to an organization—ISO, NIST, HIPAA, PCI, CIS, FedRAMP, AWS Well-Architected framework, and custom standards.

The multi-cloud governance platform utilizes various self-service operations. The multi-cloud governance platform enables administrators to configure a simplified self-service cloud consumption model for end users that are tied to approval workflows. It enables an entity to automate repetitive tasks and focus on key deliverables.

The multi-cloud governance platform continuously assesses the state of the customer's cloud workloads against well-architected frameworks to manage risk and embrace best practices. These best practices can be provided across certain 'pillars' (e.g. cost, security, operations, security, sustainability, etc.). The multi-cloud governance platform includes a Well-Architected Assessment functionality that designed to help adopt best practices, gain continuous visibility, and manage risk for cloud workloads with assessments, policies, and reports that allow a customer to review the state of a customer's applications and get a clear understanding of risk trends over time. Further, it automatically discovers issues and provides actionable insights for remediation, simplifying and streamlining the process of assessing, improving, and maintaining cloud workloads. The multi-cloud governance platform can onboard cloud accounts and manage workloads. In this way, the multi-cloud governance platform supports well-architected frameworks (WAF).

The Well-Architected Assessment functionality helps ensure user workloads are optimized as part of a strong cloud strategy in the following key areas: automate discovery and remediate at scale discovering issues across best practice areas for user cloud workloads can be difficult and time-consuming, which is why the multi-cloud governance platform implements auto-discovery and remediation features. This helps improve user productivity for detecting any issues in a cloud account or workloads and provides those insights for you to look into and remediate at scale. The Well-Architected Assessment functionality can enable collaboration with multiple teams and enable gathering information and collecting evidence for best practices can present challenges around collaboration. Since it's usually not a single person doing the assessment, but a group of people across different teams, the multi-cloud governance platform provides built-in collaboration features to make assessing user workloads easier. The Well-Architected Assessment functionality can be used to validate across multi-cloud workloads. The multi-cloud governance platform helps make it possible to validate best practices across multiple clouds by providing a single pane of glass to do a well-architected review across diverse workloads. The multi-cloud governance platform also supports a multi-cloud well architected framework for workloads that span across more than one cloud provider. The Well-Architected Assessment functionality can classify best practices. Cloud best practices can fall into multiple categories. As part of the Well-Architected Assessment functionality, the multi-cloud governance platform provides built-in pillars respective to each cloud platform (AWS, Azure, etc.) that organize best practices into relevant areas of focus, such as operations, security, sustainability, and more. The multi-cloud governance platform include these pillars to helps users clearly define which areas they need to focus on and guide you in terms of next steps to move towards a well-architected cloud infrastructure.

The Well-Architected Assessment functionality can enable map policies to workloads best practices for different cloud platforms are reinforced in the multi-cloud governance platform by built-in policies, which are mapped directly to various best practices. These policies help identify any violations in a workload based on a particular best practice. Policies come pre-loaded and pre-mapped, but you can also create and map a customer's policies. This enables you to validate user workloads against best practices with more ease and control. Automate best practices even with built in best practice classification and policies, validating user workloads against best well-architected frameworks can still require manual work.

The multi-cloud governance platform the Well-Architected Assessment functionality maps relevant policies to identify violations against certain best practice and can automate most of the work needed to validate user workloads and identify any violations, reducing the amount of overhead and effort needed on a user. Built-in suggestions for remediation can be provided. For many of The multi-cloud governance platform's automated policies, any identified violations that appear as part of an assessment will come with a suggested remediation to address it. These suggestions appear directly to the user in the multi-cloud governance platform web portal, making it easy to both find and fix any issues with user cloud workloads.

Built-in evidence tracking is provided. The multi-cloud governance platform can keep track of what steps were taken to implement best practices and address any violations is a key part of the cloud optimization process. The multi-cloud governance platform the Well-Architected Assessment functionality can simplify and streamline this part of the process by providing built-in comment and file attachment features for each best practice item included in an assessment. Users can add evidence directly in the assessment to show what was done to meet certain best practices, as well as create a milestone once an assessment is complete to log a snapshot of a workload that can be referenced later.

Clear assessment workflow is implemented by the multi-cloud governance platform. Progress through assessments with ease with a built-in workflow that helps you ensure you follow each step of the assessment process and account for each best practice item along the way. The multi-cloud governance platform can start an assessment, go through the questions, remediate any violations it finds, then reach a finishing point where you're ready to create a milestone. Export assessment reports In addition to being able to monitor user assessment results directly in the multi-cloud governance platform web portal, you can also export results as reports (e.g. PDF or image file). This makes it easy to share the results of an assessment with other members of a team, or across departments.

The multi-cloud governance platform can integrate with AWS Well-Architected (WA). The multi-cloud governance platform the Well-Architected Assessment functionality supports one-directional integration with AWS Well-Architected, meaning it can send data directly from The multi-cloud governance platform to AWS. When a user completes an assessment, whatever best practices the user provides answers can be synced to AWS so that results show there as well. This is helpful for keeping information consistent across both The multi-cloud governance platform and AWS environments. The multi-cloud governance platform's mission is to not only help with assessing cloud posture, but to provide a clear path to realizing well-architected workloads.

Just-In-Time Synthetic Computations on Time-Series Data Using A Metrics Approach Methods and systems can be used to analyze various synthetic metrics that are composed of computations on real time time-series data. This invention is related to synthetic computations that are performed on the fly on time series data when a user issues a request.

In an example embodiment, controllers expose contra points. A control point provides a value. After the value is obtained, then a classification process can determine the type of value (e.g. a temperature sensor, a gas meter, etc.). Then the data is collected to determine various relevant trends. It is noted however that when analyzing trends, it may be necessary to review multiple types of edge-device values. Therefore, there is a need to group edge-device signal together in a specified manner for improvements to trend analysis.

For example, one value can be a voltage for an edge-device, while another value can be a current for the edge-device. In this example, the user may pay for the power consumed by the edge-device. However, power is not provided natively by the consumed time series data. Accordingly, the various inputs can be synthesized into a new output. The new output can appear as a point in the system. In this way, the synthesized output can be utilized for system analytics and the like (e.g. create a dashboard view, generate an alert, etc.).

The present methods can obtain a series of time-series data inputs. These can be composed to generate a new time-series of synthetic values. This can be done such that a user need not change the software code of the system but rather merely draft an extension of the system software code.

FIG. 1 illustrates an example process 100 for a just-in-time synthetic computations on time-series data using a metrics approach, according to some embodiments. In step 102, process 100 receives a set of raw time-series data. Computations on time-series data require considerable coordination and orchestration because the data is real-time in nature and arrives at different times.

In step 104, process 100 synchronizes the raw time-series data. Process 100 can maintain the computations in a synchronized state with the raw time series data is a complex task. In step 106, process 100 implements a metrics feature that enables the creation of complex metrics that operate on time series data.

In step 108, process 100 enables a query of the computed data (e.g. specific input pattern, etc.) just as a query of the raw time series data can be performed. Process 100 can provide the query results reside and visualized right alongside time series data in step 110.

In some examples, there can be a query to specific the input pattern for the synthetic data. This can be an 'asset structure'. For example, the query can be: "find the controller that has a voltage and a current control point on the second floor". For each pair of control points, the synthetic computation can generate a power control point.

Figure 2:
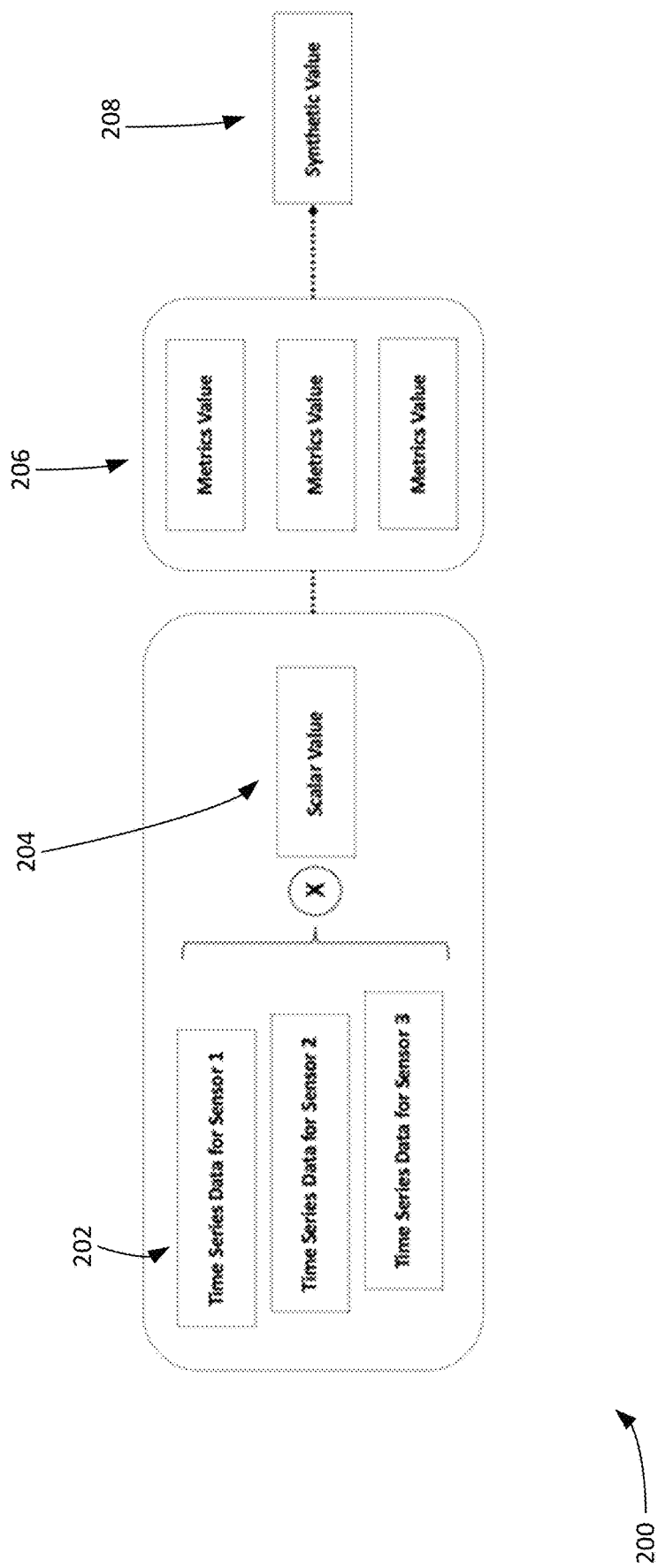
FIG. 2 illustrates an example process for computing synthetic metrics on raw time series data, according to some embodiments.

FIG. 2 illustrates an example process 200 for computing synthetic metrics on raw time series data, according to some embodiments. More specifically, process 200 obtains/ingests time series data for sensors 1-3 202. The present example utilizes sensor data; however, it is noted that any time series data can be utilized by process 200. Process 200 uses a scalar value 204 to convert time series data for sensors 1-3 202 to a set of metrics values 206. The set of metrics values 206 are then used to generate synthetic metric 208.

Process 200 can collect values and units (e.g. units for voltage, pressure, etc.). Accordingly, process 200 can analyze and reason about units and various combinations of units. For example, process 200 provides that the combination of voltage and current is power. Process 200 generates a correct unit type at the output of any computation. In this way, charts generated by process 200 can segregate data by appropriate units. Units enable process 200 to provide more context and semantics to user-end displays of the time-series data.

In one example, process 200 can use multiplication scaling on the input time-series values. For example temperature-related input values from the sensors can be in terms of 0-1000. Multiplication scaling can be used to adjust these values to 0-120 (by way of example). In this way, the outputs can be in terms relative to the Fahrenheit system. Other transformations can be implemented with multiplication scaling as well. As noted supra, current and voltage can be multiplied to obtain a power value. The power value can be integrated over time to obtain an energy value (e.g. in kilowatt hours, etc.).

It is noted that these values can be calculated on demand and not have to be processed offline. In this way, process 200 is dynamic and performed when the data is obtained and batching on the backend is avoided. Process 200 is also user programmable and generates values that have the same look and feel during runtime as the data that is natively generated by the edge-devices.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for just-in-time synthetic computations on time-series data using a metrics approach, comprising:
   receiving a set of raw time-series data from a plurality of edge-device signals;
   synchronizing the raw time-series data;
   implementing a metrics feature that enables the creation of a plurality of synthetic metrics that operate on time series data, wherein the metrics feature analyzes and reasons about units of the raw time-series data and maintains correct unit types through mathematical transformations of the raw time-series data, wherein the synthetic metrics are values that result from combining other metrics, and wherein the metrics feature analyzes and reasons about units of the raw time-series data and automatically generates a correct unit type at the output of any computation;
   enabling a query of the computed data just as a query of the raw time series data is performed, wherein the query results are visualized alongside the raw time series data in user-end displays segregated by appropriate units;
   computing a plurality of synthetic metrics on the raw time series data, and wherein the step of computing a plurality of synthetic metrics on the raw time series data further comprises:
      using a scalar value to convert the raw time series data to a set of metrics values;
   providing a set of query results are visualized alongside the time series data in a dashboard view;
   maintaining the computations in a synchronized state with the raw time series data is a complex task; and
   determining the correct unit type from a combinations of units of the sensor data, and
   wherein one or more of unit types of the sensor data are collected, and
   wherein a multiplication operation is used with the scalar value to convert the raw time series data to a set of metrics values.

2. The computerized method of claim 1, wherein the raw time series data is obtained from a plurality of sensors.

3. The computerized method of claim 2, where the query of the computed data comprises a specific input pattern.

4. The computerized method of claim 3, wherein the data is segregated by appropriate units.

5. The computerized method of claim 4, wherein the correct unit type is used to provide a context and to a user-end displays of the time-series data.

6. The computerized method of claim 5, wherein the computing a synthetic data is dynamic and performed when the sensor data is obtained and batching on the backend is avoided.

* * * * *